United States Patent [19]

Feller

[11] 4,275,291

[45] Jun. 23, 1981

[54] ROTATION SENSOR

[75] Inventor: Murray F. Feller, Dunnellon, Fla.

[73] Assignee: Wilgood Corporation, Jacksonville, Fla.

[21] Appl. No.: 935,562

[22] Filed: Aug. 21, 1978

[51] Int. Cl.³ ............................................... G01F 1/06
[52] U.S. Cl. .............................. 235/92 FL; 73/861.77
[58] Field of Search ...................... 235/92 FL, 92 FQ; 324/219, 220, 204; 73/194 E, 229

[56] References Cited

U.S. PATENT DOCUMENTS

| 3,636,767 | 1/1972 | Duffy | 73/229 |
| 3,701,277 | 10/1972 | McMahon et al. | 73/229 |
| 3,783,248 | 1/1974 | Sugden | 235/92 FL |
| 3,866,469 | 2/1975 | Wemyss | 73/229 |
| 3,949,606 | 4/1976 | Blancett | 73/229 |
| 4,023,410 | 5/1977 | Althaus | 73/229 |
| 4,140,013 | 2/1979 | Hunger | 73/229 |

Primary Examiner—Joseph M. Thesz

[57] ABSTRACT

The disclosed rotation sensors involve a first poled magnetic device that rotates with the part whose rotation is to be sensed, a second poled magnetic device coaxial with the first, magnetically induced to rotate in unison with the first magnetic device, and a sensing element disposed between the circular paths of the poles of the magnetic devices. In one form, the sensing element is a Hall-effect device. In a second form, the sensing element is a winding that provides both a rotation signal and electrical energization for local circuit equipment responsive to the signal.

13 Claims, 7 Drawing Figures

ROTATION SENSOR

The present invention relates to electrical rotation sensors and more particularly to fluid-flow sensors.

Over the years, many devices have been developed for providing electrical signals providing indication of rotation, most commonly a pick-up coil mounted adjacent to the path of rotation of a magnet mounted on a part whose rotation is to be monitored. Of special present interest are fluid-flow sensors having a casing that defines a fluid-flow passage, where a magnet mounted on a fluid-activated rotor within the casing causes a detector outside the casing to provide rotation signals. For this purpose, a pick-up coil can be used, and a Hall-effect magnetic-field sensing element has also been proposed for this purpose.

Quite separately, a widely used form of fluid flow meter involves a fluid-flow casing and a mechanical register outside the casing for metering the volume of fluid flow. There is a multi-pole magnet within the casing that drives a coaxial multi-pole magnet outside the casing, the latter being arranged to drive the mechanical register. Still further, a fluid flow meter has been proposed having an electronic register that responds to an electrical pick-up outside a fluid-flow casing, activated by a magnet mounted on a turbine-bladed rotor within the casing.

SUMMARY OF THE INVENTION

Rotation sensors described in detail below and shown in the accompanying drawings, form part of two largely electronic flow meters. They utilize conventional mechanical structure consisting of a fluid-flow casing, a fluid-driven rotor carrying a first magnetic device inside the casing that induces rotation of a second magnetic device outside the casing. At least one of those devices is magnetized but it is a distinctive advantage for both to be magnetized, and they rotate in unison. In the novel rotation sensors, an electrical sensing device or detector responsive to changes of imposed magnetic field is interposed between the rotary paths of poles of the magnetic devices. Relatively high electrical signal output is obtained.

In one form of rotation sensor described below, a Hall-effect device serves as the detector or sensing device, yielding large output signals for use in an electrical register. The signal amplitude is independent of the speed of rotation of the fluid-driven rotor. Additionally, no drag is imposed on the rotor by the sensing device. These two features contribute to accuracy, dependability and low cost of construction of the described fluid-flow sensor.

In a second form of novel rotation sensor detailed below, an induction winding is interposed between the two rotary magnetic devices. The winding is divided into plural coils connected in series, distributed in a circle between the opposite poles of the opposed magnetic devices inside and outside the casing. A large level of output signal is attained, even during slow rotations of the magnetic devices corresponding to low rates of fluid flow. Moreover the same output signal is utilized as a means for energizing the electronic circuit that responds to the signal output. In this way it becomes possible to combine the circuit apparatus with the fluid-flow sensor at an isolated location without the cost and complication of running an electrical cable to that location. When electrical energy is derived from the winding, theoretically there is always some associated drag imposed on the rotor. Such drag could affect the accuracy of a flow meter using such energization. By limiting the amount of electrical energy used, the drag can be minimized. And by making the current drain a linear or other simple function of the signal voltage, it is possible to compensate the flow meter for the error resulting from the drag imposed on the rotor at various rates of fluid flow.

The signal output of the detectors in both of the fluid-flow sensors detailed below is electrical so that a register or other apparatus that responds to the signal from the flow sensor can be located at a remote position rather than at the place where the flow sensor is installed.

The nature of the invention and its further novel features and advantages will be more fully appreciated from the following detailed description of two liquid flow meters embodying the various novel features, and shown in the accompanying drawings.

Figure 1:
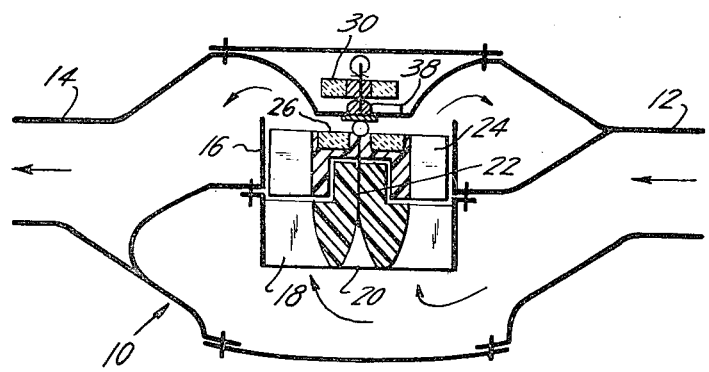
FIG. 1 is a somewhat diagrammatic central cross-section of a liquid flow sensor embodying features of the invention, this view being taken parallel to a side elevation of the flow sensor.

In the drawing, casing 10 provides a chamber for directing flow of liquid, between inlet 12 and outlet 14 along the path indicated by arrows. Casing 10 which is ordinarily of brass or other non-magnetic material (at least in the top-central area) encloses flow-directing unit 16 as of molded plastic having an outer cylindrical wall supporting flat radial vanes 18 which, in turn, fixedly support hub 20. A turbine-type rotor 24 within flow-directing unit 16 has a pivot shaft 22 rotatable in hub 20. A bearing ball 28, captive in the top of rotor 24 in line with shaft 22, bears against a sapphire plate 28 fixed to the top wall of casing 10.

Outside casing 10 and coaxial with shaft 22 is a ceramic magnet 30 (FIGS. 1–3) which is rotatable about shaft 34 and supported by end bearing 32. Retainer 36 on shaft 34 holds magnet 30 in its assembled condition on shaft 34. Inside the casing and coaxial with shafts 22 and 34 and with rotatable magnet 30 there is another ceramic magnet 26 (FIGS. 1, 2 and 4) fixed to rotor 24. These magnets may, of course, be of other materials provided that the material of magnet 26 is to be essentially immune to attack and erosion by the fluid to be metered. The magnetic devices are polarized top-to-bottom, and the poles are regularly spaced so that, in operation, each North pole at the top of magnetic device 26 is opposite to a South pole at the bottom of magnetic device 30, and each South pole at the top of magnetic device 26 is opposite to a North pole at the bottom of magnetic device 30. The North and South poles alternate about the common axis of shafts 22 and 34. As shown, magnetic device 26 is a four-armed device and magnetic device 30 is an annulus.

The construction thus far described and illustrated, involving permanent magnets, represents part of a standard commercial liquid flow meter made by Hersey Products Inc. at Dedham, Mass. In that flow meter, magnetic device 30 is fixed to a gear at the high-speed end of a speed-reduction gear train which operates odometer wheels, to indicate the aggregate quantity of fluid flow over a period of time. In another flow meter made by Hersey, magnetic device 30 drives a gear train to operate a wind-up spring; and when the spring is wound up to a certain extent, it is released to whip a small magnet past an induction coil so that a pulse is emitted for transmission to a remote monitoring apparatus such as an electrically activated register.

Figure 3:
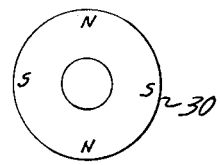
FIGS. 3, 4 and 5 are enlarged plan views of three elements in the flow sensor of FIGS. 1 and 2.
Figure 2:
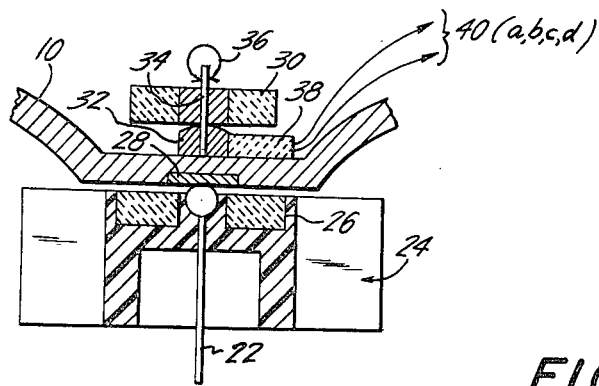
FIG. 2 is an enlarged fragment of a portion of FIG. 1.
Figure 4:
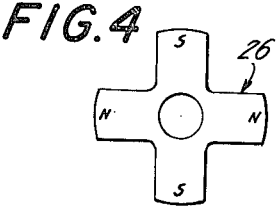
Figure 5:
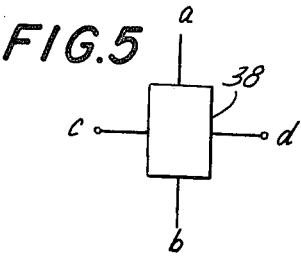

In FIGS. 1–3, a detector or electrical sensing device in the form of a Hall-effect device 38 is disposed outside casing 10 between the circular paths of the poles of magnetic devices 26 and 30. While a two-terminal Hall-effect device can be used, the four-terminal Hall-effect device (FIG. 5) is vastly superior. The magnetic field of magnets 26 and 30 is impressed perpendicular to the wafer-like body of device 38. Terminals a and b are used to provide a bias current across the body of the device. Output is generated in body 38 which is available at end terminals c and d as a function of the magnetic field impressed on the body of element 38, fluctuating widely as the magnetic field-strength fluctuates and as its polarity reverses in the course of rotation of the poled magnetic devices. In common with the two-terminal Hall-effect device, the output signal strength of four-terminal device 38 is independent (within practical limits) of the frequency of the variations in magnetic field strength. Unlike a mechanical register, device 38 does not impose loading on the rotation of magnet 30. Consequently magnet 30 can rotate strictly in unison with magnet 26 as the latter rotates, and a virtually constant relationship can be maintained between any given pole of magnet 26 and the opposite pole of magnet 30. Therefore a very wide range of variation in magnetic field strength is imposed on the Hall-effect element as aligned N/S poles of magnet 26 and magnet 30 leave element 38 and aligned S/N poles of magnet 26 and magnet 30 become aligned with element 30. The range of change of magnetic field-strength remains consistently high despite wide changes in the flow rate and sudden starts and stops of the liquid flow. The existence of tracked magnets at opposite sides of Hall-effect device 38 imposes a far greater intensity of field strength than would develop in case only magnet 26 is used. The fact that opposed magnets 26 and 30 are used is important, in that the resultant magnetic field between them has a nearly ideal shape and it is virtually perpendicular to the body of the Hall-effect device. One result of using opposed magnets is that an optimum relationship is established between the Hall-effect device and the magnetic field to which that device responds. Secondly, the spacing between the two magnets and the spacing between the Hall-effect device and either of the magnets is relatively non-critical. The output signal strength is relatively high and the signal-to-noise ratio is high so that much less amplification is required. All of these effects are in contrast with the performance of a similar flow sensor, the same as that illustrated except that magnet 30 is omitted. The system is virtually unaffected by wide or sudden changes in rate-of-flow. Of great importance is the provision of large output signals without loading or imposing drag on the rotor. This characteristic promotes accuracy of the flow meter over a wide range of flow rates.

Both members 26 and 30 are not merely magnetic, but they are magnetized. Of course both of these members can be like member 26, both can be like member 30, and they can also be replaced by assemblies of separate magnets. An operative construction can be realized by making one of the elements (for example element 30) of magnetic material but not magnetized and of the four-armed shape matching element 26. As in the construction shown, the two would rotate in unison, and the magnetic field would be directed transverse to the Hall-effect element. The range of magnetic field-strength variation would be far greater than would be the case without element 30.

The low mass of ceramic element 30 and its high contribution to the magnetic field make the illustrated configuration highly advantage. Were element 30 made of high-permeability iron alloy, it would tend to have greater mass and have greater inertia effects than the ceramic magnet illustrated, and a weaker field would be impressed on element 38.

Figure 6:
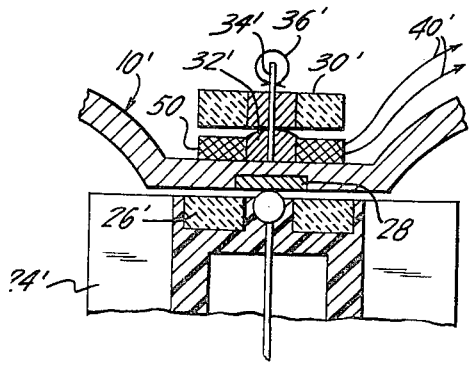
FIG. 6 is a modification of FIG. 2, illustrating further features of the invention.
Figure 7:
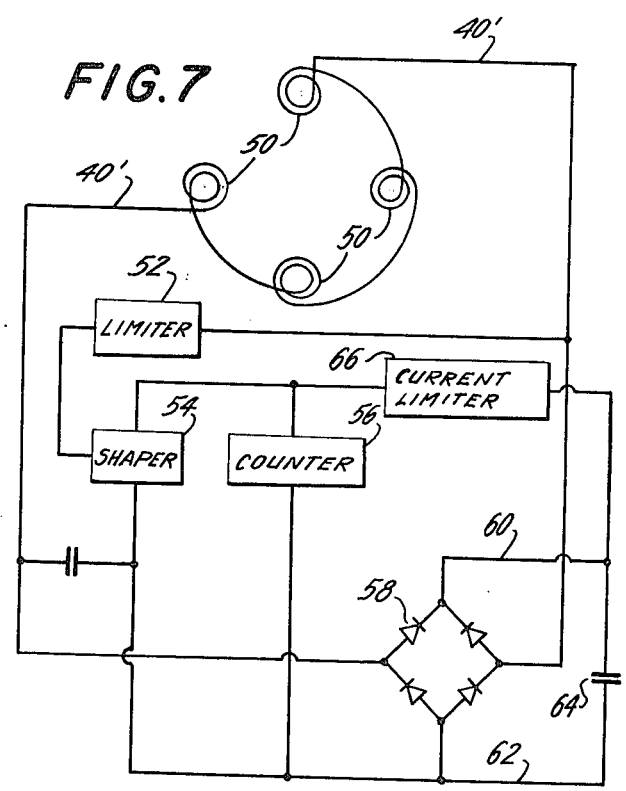
FIG. 7 is a wiring diagram of a flow meter including a sensing element of FIG. 5, illustrating further features of the invention.

FIGS. 6 and 7 show a further embodiment of an aspect of the invention in FIGS. 1–5. Replacing the Hall-effect element 38 of FIGS. 1, 2 and 5, FIGS. 6 and 7 include series-connected coils 50 whose spacing and polarization is such that their output voltages are additive as the poles of magnets 26' and 30' sweep past them. The frequency and the peak value of the alternating voltage that is thus induced is a function of the rate of flow, greater flow rates yielding high voltages at higher frequencies. As in the embodiment of FIGS. 1–5, there are tracked magnetic members inside and outside the liquid-flow casing, and the magnetic members not only track with each other but, in their tracked condition, they develop a great latitude of field strength variation at the field-responsive coils 50, as in the case of the Hall-effect device 38 (FIG. 2).

The output of coils 50 at terminals 40' can be utilized for providing electrical operation of a local register, calculator or the like, not only in providing signal input but also in providing the essential electrical energization. FIG. 7 is a diagrammatic illustration of a system implementing these concepts. Coils 50 (or perhaps one of them) deliver a signal to shaper 54, the frequency of the signal representing the flow rate. Shaper 54 delivers the signal to some form of utilization device such as counter 56. If appropriate, a frequency divider may be interposed. A limiter 52 such as a high series resistance limits the voltage that reaches shaper 54.

The output of coils 50 is also applied to bridge rectifier 58, connected by leads 60 and 62 to filter and storage capacitor 64; and the resulting direct-current output is used to energize shaper and counter circuits 54 and 56. Current limiter 66, which may be a series resistor, limits the voltage on the energized circuits. Limiter 66 and the energized circuits should represent a small electrical load in terms of the resulting drag on the liquid-driven rotor 24'. In this way, the necessary power can be developed for energizing a liquid-flow register circuit without imposing undue loading on magnet 30' and rotor 24' over a wide range of flow rates. A modest amount of electrical loading and the resulting drag on the turbine rotor can be taken into account by means of a compensating circuit in the flow-meter. Notably, electrical circuit apparatus that responds to the signal from the flow sensor can be located at the flow sensor to form a single unit that does not depend on a locally available source of electricity.

The foregoing illustrative examples of the various features of the invention are susceptible to a wide range of modification and varied application, and therefore the appended claims should be construed broadly in accordance with their true spirit and scope.

I claim:

1. Flow measuring apparatus comprising means for defining a fluid-flow passage and including a non-magnetic wall, a flow-activated rotor in said passage bearing first rotary means opposite to said nonmagnetic wall, second rotary means outside said wall coaxial with said first rotary means, said first and second rotary means having first and second localized portions, respectively, of magnetic material opposite each other and a said localized portion of at least one of said rotary means being magnetized for causing the first and second rotary means to rotate in unison, said first and second localized portions staying opposite each other and moving in respective mutually opposite circular paths, a detector that yields changing electrical output in response to changes in imposed magnetic field, said detector being disposed outside said wall between said circular paths for providing a succession of signals proportional to the number of rotations of said flow-activated rotor, and means for indicating a measure of the rotation of rotary device, said last-named means being coupled to said detector and responsive thereto.

2. Flow measuring apparatus as in claim 1, wherein the localized portions of both said first and second rotary means are magnetized and wherein the opposite localized portions thereof are oppositely polarized.

3. Flow measuring apparatus as in claim 2, wherein each of said rotary means has a plurality of said localized portions, each being magnetized, and wherein the polarization of each said portion of each of said first rotary means and of said second rotary means is the opposite of the polarization of its neighboring portions.

4. Flow measuring apparatus as in claim 1, wherein said detector is an induction winding comprising at least one induction coil.

5. Flow measuring apparatus as in claim 1, wherein said detector is an induction winding comprising plural induction coils connected in a series circuit, said coils being disposed at successive locations between said opposed paths of rotation to produce concurrent output and being polarized electrically in relation to each other for additive output.

6. Flow measuring apparatus as in claim 1, wherein said detector is an induction winding in which output pulses are generated during rotation of said magnetic means, further including an energizing circuit having means for converting output from the winding into sustained direct-current voltage, and wherein said measurement means comprises an electronic counter circuit energized by said sustained direct-current voltage and having signal input terminals coupled to said winding.

7. Flow measuring apparatus as in claim 1, wherein said detector is a Hall-effect device having a body portion and having connections providing a current path therein perpendicular to the imposed magnetic field.

8. Rotation-measuring apparatus comprising a first rotary device whose rotation is to be monitored and a second rotary device coaxial therewith, said rotary devices having localized first and second magnetic portions, respectively, operable in circular paths, said first and second magnetic portions being opposite one another and a said localized magnetic portion of at least one of said rotary devices being magnetized so that said first and second coaxial rotary devices are coupled to each other for rotation in unison, a stationary detector yielding electrical output that changes in response to changes in the impressed magnetic field, said detector being disposed between said circular paths of said first and second magnetic portions for providing an output signal whose frequency is proportional to the speed of said first rotary device, and means for indicating a measure of the rotation of said rotary device said last-named means being coupled to said detector and responsive thereto.

9. Rotation measuring apparatus as in claim 8 wherein said detector is a Hall-effect device.

10. Flow measuring apparatus as in claim 8, wherein said detector is a four-terminal Hall-effect device having output connections and having connections providing a bias current therein perpendicular to the magnetic field that develops between said first and second localized portions.

11. A flow sensor comprising means for defining a fluid-flow passage, a flow-activated rotor in said passage bearing first rotary means, second rotary means coupled to said first rotary means for operation in unison therewith about the axis of the rotor, a Hall-effect detector that yields changing electrical output in response to changes in imposed magnetic field, said first rotary means having at least one first localized portion of magnetic material and said second rotary means having at least one second localized portion of magnetic material, at least one of said first and second localized portions being magnetized, said first and second localized portions being disposed opposite each other and being operable in circular paths about said axis at opposite sides of said detector to pass by said detector intermittently during the rotation of said first and second rotary means, enabling the sensor to provide a succession of signals proportional to the number of rotations of the flow-activated rotor.

12. A rotation sensor as in claim 11, wherein said detector is an induction winding in which output pulses are generated during rotation of said rotary means, further including an energizing circuit having means for converting output from the winding into sustained direct-current voltage, and an electronic counter circuit energized by said sustained direct-current voltage and having signal input terminals coupled to said winding.

13. A flow sensor as in claim 11, further including measurement means having input signal connections from said detector for providing a measure of fluid flow.

* * * * *